Aug. 30, 1927.

T. E. BARTON

SAND DISTRIBUTOR

Filed Feb. 2, 1927

1,640,636

Inventor
Thomas Edward Barton
By Frederick C. Bromley
Attorney.

Patented Aug. 30, 1927.

1,640,636

UNITED STATES PATENT OFFICE

THOMAS EDWARD BARTON, OF TORONTO, ONTARIO, CANADA.

SAND DISTRIBUTOR.

Application filed February 2, 1927. Serial No. 165,415.

The invention relates to improvements in sand distributors as described in the present specification and shown in the accompanying drawings which form part of the same.

The invention has for its primary object the provision of an appliance to be operated by the driver of an automobile for the purpose of discharging sand in advance of the road driving wheels for the purpose of securing tractive power when passing over slippery ground and also to aid stopping in an emergency.

More particularly the invention has for its object to embody sandboxes in the hollow wall of a car body so as to contain a supply of sand which will not take up any of the useful space of a car and, furthermore, will not in any way affect the appearance of the car itself as would be the case with the addition of an extraneous box, which might be detrimental to the line of the car-body. Also, the location of this box within the customary wall spacing provided between the outer and inner walls of the car body makes its construction particularly convenient from a manufacturing point of view.

A distinctive feature of the invention resides in the novel construction of gate mechanism for controlling the mouths of the sand-box spouts and a still further feature exists in the novel construction and arrangement of the mechanism whereby these gates are actuated. One form of the gate operating mechanism is intended for manual actuation, while the other is pedal operated.

Referring to the drawings, Figure 1 is a fragmentary view of a car having portions of the body broken away in order to show the invention.

Like numerals of reference indicate corresponding parts in each of the figures throughout the drawings.

Figures 1, 2, 3, 4, 5:
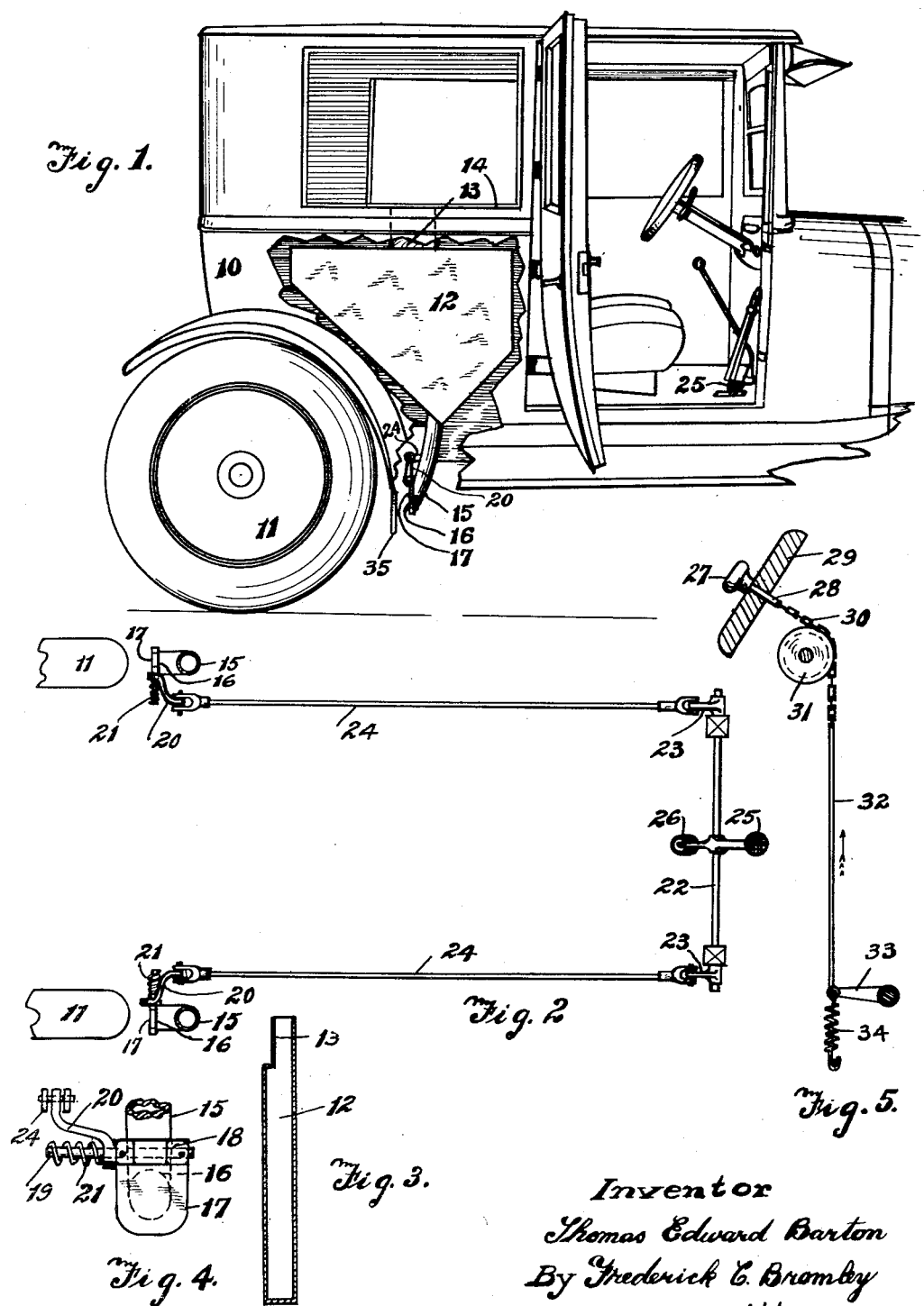
Figure 2 is a more or less diagrammatic plan view of the spouts and the pedal gate mechanism.
Figure 3 is a vertical sectional view of the sandbox.
Figure 4 is a detail showing the spout gate and its connection to the operating mechanism.
Figure 5 is a modified form of the invention showing the manual gate operating mechanism.

In the drawings, the reference numeral 10 designates generally the car body and 11 the rear driving wheels thereof, one of which only appears to view in the drawings.

The car shown is of the closed-body passenger type. On each side of the car between the outer and inner wall is provided a sand-box 12 suitably secured and built within the car body, the box being of such shape as will conform to the available space at the region of the rear road wheels as clearly shown in Figure 1. The top of the box has a fill-opening 13 which communicates with the inside of the car at the vicinity of the lower sash frame 14. This filling opening may be capped in any conventional manner.

Extending from the converging or inclined bottom of each sandbox is a spout 15 which is directed to approach the close proximity of one of the rear driving wheels and has a mouth 16. This mouth is normally closed by a gate 17 hinged to the spout as at 18. The pintle of the hinge is extended at one side, as at 19, and carries a lever 20 keyed thereto. 21 is a torsional spring carried by the pintle. This spring is connected at its outer end to the pintle and at its other end to the spout 15 so as to exert pressure tending to normally hold the gate against the mouth 16 to prevent discharge of sand. On this account the pintle is fastened in any well known manner to the gate in order to turn therewith.

22 is a transverse shaft suitably journalled in the chassis of the car and located in close proximity to the footboard containing the usual manipulating levers.

Each end of the shaft carries a keyed lever 23. From each of these levers rearwardly runs a rod as at 24 which connects to one of the levers 20 of the gates 17.

25 is a pedal rigidly mounted on the shaft 22 and extending upwardly from the footboard of the car and positioned within easy access of the driver's seat, as discernible in Figure 1.

26 is a spring of any suitable kind that is connected to the pedal 25 that it exercises pressure tending to hold it in a normal position and cooperates with the springs 21 of the gates.

In the operation of the invention as above recounted, the driver when desiring to discharge sand upon the road in advance of the road driving wheels, merely momentarily depresses the pedal 25 which through its road and lever connections opens the gates 17 permitting sand to escape through the mouths 16 of the spouts 15 and falling upon the road surface.

In the modified form of the invention shown in Figure 5, 27 is a knob carried by a stem 28 that passes through the instrument board 29 of the car at some convenient location within the driver's reach. The stem 28 is connected to a flexible element 30 shown in the drawing in the form of a length of chain. The chain passes over a sheave 31 suitably journalled in the car body. 32 is a rod attached to the chain at one end and at the other end to a lever 33. This lever replaces the pedal 25 shown in Figures 1 and 2, and has a spring 34 to hold the button 27 in a normal position and to take the place of the spring 26.

In the operation of this modified form, the button 27 is manually pulled and through its connections turns the shaft 22 which in turn operates the gates 17 as heretofore recounted.

With a view to preventing the gates 17 from becoming clogged with ice, snow or mud in inclement weather it is proposed to place a flap of leather or some other material between the road wheel and the gate in order to shield the mouth 16.

While in many cars it is customary that the rear windows of the car are fixed, in the event of these being constructed to open downwardly it will be evident that they would cause an interference with the sandbox located therebelow, in which case it is suggested that the sandboxes be located beneath the rear seat of the car.

While the invention is shown in the drawings as applied to a closed-bodied car, it will be evident that it might be equally well adopted for cars having open bodies.

What I claim is:—

1. In a sand distributor of the class described the combination with the body of an automobile, of a sandbox disposed between the inner and outer wall partitions of the body in the vicinity of the road driving wheels, and a fill opening having external communication with respect to the wall.

2. In a sand distributor of the class described the combination with the body of an automobile, of a sandbox disposed between the inner and outer wall partitions of the body in the vicinity of the road driving wheels, and a fill opening extending through the sash frame to communicate with the interior of the body.

Signed at Toronto, Canada, this 26th day of January, 1927.

THOMAS EDWARD BARTON.